United States Patent
Yamamoto et al.

(10) Patent No.: US 8,092,090 B2
(45) Date of Patent: Jan. 10, 2012

(54) FLUID DYNAMIC BEARING DEVICE

(75) Inventors: Tetsuya Yamamoto, Kuwana (JP); Kenji Ito, Kuwana (JP); Isao Komori, Kuwana (JP)

(73) Assignee: NTN Corporation, Osaka (JP)

( * ) Notice: Subject to any disclaimer, the term of this patent is extended or adjusted under 35 U.S.C. 154(b) by 733 days.

(21) Appl. No.: 12/281,555

(22) PCT Filed: Feb. 21, 2007

(86) PCT No.: PCT/JP2007/053139
§ 371 (c)(1),
(2), (4) Date: Sep. 3, 2008

(87) PCT Pub. No.: WO2007/102312
PCT Pub. Date: Sep. 13, 2007

(65) Prior Publication Data
US 2009/0022439 A1    Jan. 22, 2009

(30) Foreign Application Priority Data

Mar. 6, 2006  (JP) ................................. 2006-059868
Mar. 27, 2006 (JP) ................................. 2006-086137

(51) Int. Cl.
*F16C 32/06* (2006.01)
(52) U.S. Cl. ...................................... 384/100; 384/107
(58) Field of Classification Search .................. 384/100, 384/107–124
See application file for complete search history.

(56) References Cited

U.S. PATENT DOCUMENTS

| | | | | |
|---|---|---|---|---|
| 4,934,836 A | * | 6/1990 | Tanaka et al. ................. | 384/100 |
| 5,009,520 A | * | 4/1991 | Takajo et al. .................. | 384/100 |
| 5,472,283 A | * | 12/1995 | Takahashi et al. ............. | 384/100 |
| 5,708,520 A | * | 1/1998 | Yoshitsugu et al. ....... | 359/200.1 |
| 6,412,984 B2 | * | 7/2002 | Asai et al. ....................... | 384/107 |
| 7,391,139 B2 | * | 6/2008 | Yamamoto ....................... | 310/90 |
| 7,556,433 B2 | * | 7/2009 | Kurimura et al. ............. | 384/107 |
| 2001/0001269 A1 | * | 5/2001 | Asai ............................... | 384/100 |

FOREIGN PATENT DOCUMENTS

| | | |
|---|---|---|
| JP | 2004-132402 A | 4/2004 |
| JP | 2004-190786 A | 7/2004 |
| JP | 2004-301338 A | 10/2004 |
| JP | 2005-114164 A | 4/2005 |
| JP | 2005-282779 A | 10/2005 |
| JP | 2005-337490 A | 12/2005 |
| JP | 2006-46461 A | 2/2006 |

OTHER PUBLICATIONS

Machine English Translation of JP 2004-301338.*
Machine English Translation of JP 2005-282779.*
International Search Report of PCT/JP2007/053139, date of mailing Apr. 17, 2007.

* cited by examiner

*Primary Examiner* — Thomas R Hannon
(74) *Attorney, Agent, or Firm* — Westerman, Hattori, Daniels & Adrian, LLP

(57) ABSTRACT

A fluid dynamic bearing device having high bearing performance at low cost is provided.

A bearing member 6 includes an inner diameter part 8 having a radial bearing surface and an outer diameter part 7 having a mounting surface for a bracket 5. Both the inner diameter part 8 and the outer diameter part 7 are made of a resin. The inner diameter part 8 is preferably formed of an oil-impregnated resin, and more preferably a porous resin, and the outer diameter part 7 is formed of a nonporous resin.

10 Claims, 13 Drawing Sheets

FLUID DYNAMIC BEARING DEVICE

This application claims priority to PCT/JP2007/053139 filed Feb. 21, 2007. Further, this application claims priority under 35 U.S.C. §119 to Japanese Application No. 2006-059896 filed Mar. 6, 2006 and Japanese Application No. 2006-086137 filed Mar. 27, 2006.

TECHNICAL FIELD

The present invention relates to a fluid dynamic bearing device.

BACKGROUND ART

Fluid dynamic bearing device is a bearing device that rotatably supports a shaft member with an oil film that is formed in bearing clearances by relative rotation between a bearing member and the shaft member. The fluid dynamic bearing device has such characteristics as high speed rotation, high rotation accuracy, and low noise. Making the best use of those characteristics, they have been widely used in recent years as bearings intended for spindle motors to be mounted on information devices, including magnetic disk drives such as HDD and FDD, optical disc drives such as CD-ROM, CD-R/RW, and DVD-ROM/RAM, and magneto-optical disc drives such as MD and MO, polygon scanner motors to be mounted on laser beam printers (LBP) and the like, fan motors to be mounted on personal computers (PC) and the like, and small-sized motors to be mounted on electronic appliances such as axial fans.

Fluid dynamic bearings of this type are broadly classified into dynamic bearings which have dynamic pressure generating portions for generating the dynamic pressure of a fluid (such as lubricating oil) in their bearing clearances, and so-called cylindrical bearings (bearings with cylindrical bearing surfaces) which have no dynamic pressure generating portion.

For example, a fluid dynamic bearing device to be mounted on a spindle motor of a HDD or the like is provided with a radial bearing portion for supporting a shaft member in a radial direction and a thrust bearing portion for supporting the shaft member in a thrust direction. For its bearing, the radial bearing portion often uses a dynamic bearing in which two surfaces opposed across a radial bearing clearance (the outer periphery of the shaft member or the inner periphery of the bearing member) are provided with grooves for generating a dynamic pressure. Meanwhile, the thrust bearing portion may use either a dynamic bearing or a bearing that has the structure of supporting one end of the shaft member by contact (so-called pivot bearing).

Bearing member to be built into this type of fluid dynamic bearing device is composed of an inner diameter part (bearing sleeve) which has a radial bearing surface, and an outer diameter part (housing) which has a mounting surface intended for other members on its outer periphery. For the purpose of cost saving, bearing device having an outer diameter part made of a resin, such as disclosed in Japanese Patent Application Laid-Open No. 2005-114162 (patent document 1), have been proposed recently.

Patent Document 1: Japanese Patent Application Laid-Open No. 2005-114164

DISCLOSURE OF THE INVENTION

Problem to be Solved by the Invention

With rapidly falling prices of information devices in recent years, a further cost reduction has been desired of fluid dynamic bearing devices. In the bearing device described in patent document 1, the inner diameter part and the outer diameter part are configured as separate members. The inner diameter part is often made of a porous body of sintered metal capable of retaining lubricating oil inside, so that poor lubrication, wear, and the like ascribable to the sliding contact with the shaft member are prevented to maintain high bearing performance over a long period of time. To form an inner diameter part of sintered metal with high precision, however, requires a large number of process steps, and typically increases the manufacturing cost easily. In particular, a greater number of steps are required when forming a dynamic pressure generating portion such as dynamic pressure generating grooves in the inner diameter part.

An object of the present invention is to provide a fluid dynamic bearing device having high bearing performance at low cost.

Means for Solving the Problem

To solve the foregoing problem, the present invention provides a fluid dynamic bearing device including: a bearing member including an inner diameter part having a radial bearing surface and an outer diameter part having a mounting surface for another member; and a radial bearing portion for supporting a shaft to be supported in a radial direction with an oil film formed in a radial bearing clearance which the radial bearing surface faces, and is characterized in that both the inner diameter part and the outer diameter part of the bearing member are made of a resin. Incidentally, examples of the "another member" mentioned above include a bracket as motor base, and a stator coil.

As described above, according to the present invention, both the inner diameter part and the outer diameter part of the bearing member are made of a resin. As compared to the conventional configuration where the inner diameter part is made of sintered metal, the simplified manufacturing steps and the lowered material cost allow a reduction of the manufacturing cost.

Now, among possible means for fixing the inner diameter part and the outer diameter part to each other is adhesion. The adhesion cannot provide a sufficient fixing force, however, and the inner diameter part may come off from the outer diameter part, i.e., the bearing may go out of function when undergoing an excessive impact load. To avoid such coming off, the inner diameter part and the outer diameter part can be molded integrally. This configuration, however, precludes oil supply from the inner diameter part to the bearing clearances, possibly leading to poor lubrication due to a lack of oil in the bearing clearances. In addition to this, the inner diameter part and the outer diameter part require respective different functions. Molding these parts integrally out of common material thus makes it inevitably difficult to satisfy the functions both require, limiting the improvement of the bearing performance.

In this respect, if the inner and outer diameter parts of the bearing member are formed as separate parts both out of a resin as mentioned above, the two parts can be fixed firmly by such means as welding. This makes it possible to secure a high unmating force between the inner diameter part and the outer diameter part, thereby improving the impact load resistance of the fluid dynamic bearing device.

The inner diameter part and the outer diameter part of the bearing member may be made of different resins. According to this configuration, resin compositions suited to the properties required of the inner diameter part and the outer diameter part can be selected and used for the respective parts. This makes it possible to improve the bearing performance of the entire bearing device. Note that the foregoing "different resins" shall not only refer to ones "having different base resins," but also cover ones "that are compositionally different in terms of the entire resin compositions, including fillers and the like." That is, the "different resins" shall also cover such cases that the inner diameter part and the outer diameter part are made of resin compositions that have the same base resin but with fillers of different types or in different compounding ratios. Furthermore, even if the types and compounding ratios of the base resins and fillers are all identical, ones having different concentrations (such as a nonporous resin and a porous resin) are also covered by the "different resins."

For example, when the inner diameter part having the radial bearing surface is made of an oil-impregnated resin, or porous oil-impregnated resin in particular, the oil retained in the pores of the inner diameter part can exude to the surface for an abundant supply of oil to the bearing clearances including the radial bearing clearance and thrust bearing clearance. This allows high lubricating performance. The porous oil-impregnated resin is formed, for example, by injection molding a resin material that contains a pore forming material, and then removing the pore forming material, followed by oil impregnation.

Moreover, when the outer diameter part is made of a solid resin composition having no pore (nonporous resin), it is possible to avoid such adverse effects as oil leakage to outside the bearing and a drop in the adhesion strength with other members ascribable to the exudation of oil from the pores.

When both the inner diameter part and the outer diameter part of the bearing member are made of a resin, this bearing member can be injection molded with either one of the inner diameter part and the outer diameter part as an insert. With the insert molding, the assembly precision between the inner diameter part and the outer diameter part can be improved by simply increasing the die precision. Besides, the molding of the inner diameter part or the outer diameter part and the assembly of the two parts can be performed in a single process, which allows a further reduction in the cost of the fluid dynamic bearing device.

Now, take the case of injection molding (insert molding) the member with part of its insert exposed to the cavity. In order to avoid a drop in precision due to the heat during the insert molding, the insert is typically made of a material that has a higher melting point than that of the injection material. This requires, however, that the insert be formed at high precision and the injection molding dies of high precision be prepared as well, possibly failing to provide the cost advantage of the insert molding sufficiently.

This problem can be solved by forming the inner diameter part and the outer diameter part out of different resins, and using one of the inner diameter part and the outer diameter part that has a lower melting point as the insert. That is, with this configuration, the surface of the member that is used as the insert can be deformed to the surface of an insert molding die (i.e., the surface of the inner mold) by the heat and pressing force during the insert molding. This requires only that the insert molding dies be formed at high precision, while the insert may have a rough part precision in the molding phase, contributing to a further reduction of the manufacturing cost.

According to the foregoing configuration, the radial bearing surface of the inner diameter part may be provided with a dynamic pressure generating portion for generating the dynamic pressure of fluid in the radial bearing clearance. Consequently, the radial bearing portion can be configured as a dynamic bearing which has excellent rotation accuracy. In particular, suppose that the bearing member is an injection molded article with either one of the inner diameter part and the outer diameter part as an insert, for example, that the inner diameter part is made of a resin composition having a melting point lower than that of the outer diameter part and is used as an insert. Then, a molding die corresponding to the shape of the dynamic pressure generating portion may be formed on the inner mold in advance so that the dynamic pressure generating portion can be formed on the radial bearing surface of the inner diameter part simultaneously with the insert molding through the use of the foregoing characteristics. In this case, the number of steps can be reduced as compared to the case of forming this type of dynamic pressure generating portion on sintered metal beforehand.

Here, the heat applied during the insert molding melts the surface of the insert into melt bonding, or creates asperities in the bonding interface with the mold-side member. The bonding strength between the inner diameter part and the outer diameter part is thus enhanced by a so-called anchoring effect.

Even when the bearing member is formed as an injection molded article with either one of the inner diameter part and the outer diameter part as an insert, the inner diameter part is preferably made of an oil-impregnated resin which is capable of supplying lubricating oil to the bearing clearance. In particular, it is more preferably made of a resin porous body capable of retaining a sufficient amount of lubricating oil, being a porous body like sintered metal. The reason is that the resin porous body, as described above, can be formed by injection molding a resin that contains a pore forming material and removing the pore forming material subsequently, the manufacturing steps being simpler than with sintered metal.

The fluid dynamic bearing device of the foregoing configuration can be suitably used for a motor that has a rotor magnet and a stator coil, such as a HDD spindle motor.

Figure 1:
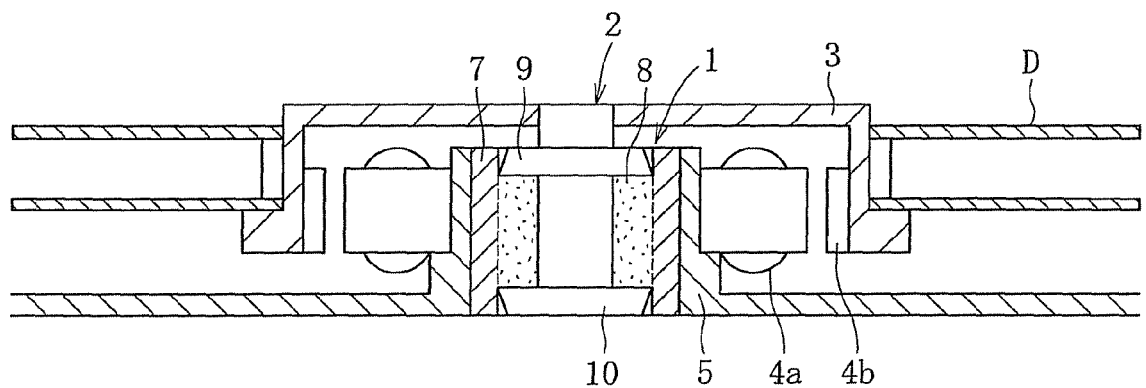
FIG. 1 is a sectional view of a spindle motor intended for information devices, incorporating a fluid dynamic bearing device according to the present invention.

EXPLANATION OF THE REFERENCE NUMERALS 1, 21 fluid dynamic bearing device
2, 22 shaft member
4a stator coil
4b rotor magnet
5 bracket
6, 26 bearing member
7, 27 outer diameter part
8, 28 inner diameter part
9, 29 first flange part
10, 30 second flange part
R1, R2 radial bearing portion
T1, T2 thrust bearing portion
S1, S2 seal space

EFFECT OF THE INVENTION

As above, according to the present invention, it is possible to provide a fluid dynamic bearing device having high bearing performance at low cost.

BEST MODE FOR CARRYING OUT THE INVENTION

Hereinafter, embodiments of the present invention will be described with reference to the drawings.

FIG. 1 conceptually shows a configuration example of an information device spindle motor which incorporates a fluid dynamic bearing device. This spindle motor is intended for a HDD or other disk drive, and includes a fluid dynamic bearing device 1 which rotatably supports a shaft member 2 having a disk hub 3 mounted thereon, a stator coil 4a and a rotor magnet 4b which are opposed to each other, for example, across a radial gap, and a bracket 5. The stator coil 4a is attached to the outer periphery of the bracket 5. The rotor magnet 4b is attached to the outer periphery of the disk hub 3. A bearing member 6 of the fluid dynamic bearing device 1 is fixed to the inner periphery of the bracket 5. The disk hub 3 holds one or more disk-like information recording media such as magnetic disks (hereinafter, referred to simply as disks). In the spindle motor configured thus, when the stator coil 4a is energized, an electromagnetic force occurring between the stator coil 4a and the rotor magnet 4b rotates the rotor magnet 4b. As a result, the disk hub 3 and the disks D held by the disk hub 3 rotate together with the shaft member 2.

Figure 2:
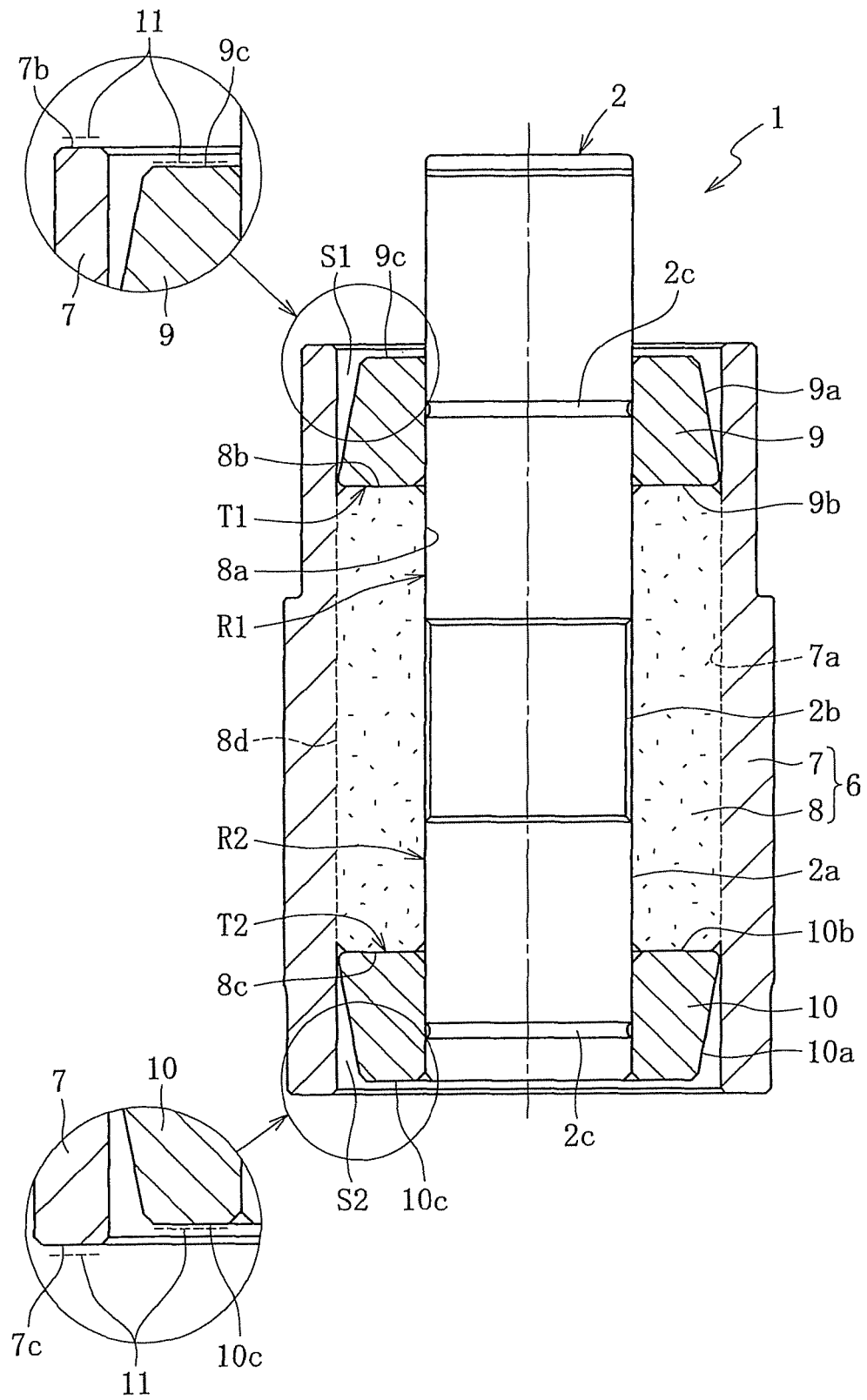
FIG. 2 is a sectional view showing a first configuration example of a first embodiment of the fluid dynamic bearing device according to the present invention.

FIG. 2 shows an example of the fluid dynamic bearing device for use in the foregoing spindle motor, showing an example (first configuration example) of a first embodiment of the fluid dynamic bearing device according to the present invention. The fluid dynamic bearing device 1 shown in the diagram includes, as its primary components, a shaft member 2 on the rotating side and a bearing member 6 on the stationary side. For convenience of explanation, the following description will be given with the side where an end of the shaft member 2 protrudes from the opening of the bearing member 6 as top side, and with the axially opposite side as bottom side.

In the present configuration example, a first radial bearing portion R1 and a second radial bearing portion R2 are formed between the inner periphery 8a of an inner diameter part 8a, which constitutes the bearing member 6, and the outer periphery 2a of the shaft member 2 so that they are axially separated from each other. In addition, a first thrust bearing portion T1 is formed between the top end 8b of the inner diameter part 8 and the bottom end 9b of a first flange part 9. A second thrust bearing portion T2 is formed between the bottom end 8c of the inner diameter part 8 and the top end 10b of a second flange part 10.

The shaft member 2 is made of a metal material such as stainless steel, or has a hybrid structure of metal and resin. The entire shaft member 2 is shaped like a shaft of generally uniform diameter, with a relief portion 2b of slightly smaller diameter in the midsection. The outer periphery 2a of the shaft member 2 has recesses, such as circumferential grooves 2c, in the positions where the first and second flange parts 9 and 10 are fixed to.

The bearing member 6 is composed of the inner diameter part 8 of cylindrical shape which is made of a porous body of resin (porous resin) and corresponds to a bearing sleeve according to the conventional configurations, and an outer diameter part 7 of generally cylindrical shape which is made of a nonporous body of resin and corresponds to a housing according to the conventional configurations, to the inner periphery of which the inner diameter part 8 can be fixed. The inner diameter part 8 of porous resin is formed, for example, by injection molding a resin composition that contains a pore forming material, and then removing the pore forming material with water, alcohol, or other solvents. Aside from the injection molding mentioned above, the inner diameter part 8 may also be molded by using such techniques as compression molding, extrusion molding, blow molding, vacuum molding, and transfer molding, depending on the shape of the inner diameter part 8, the selected resin material, etc.

Figure 3:
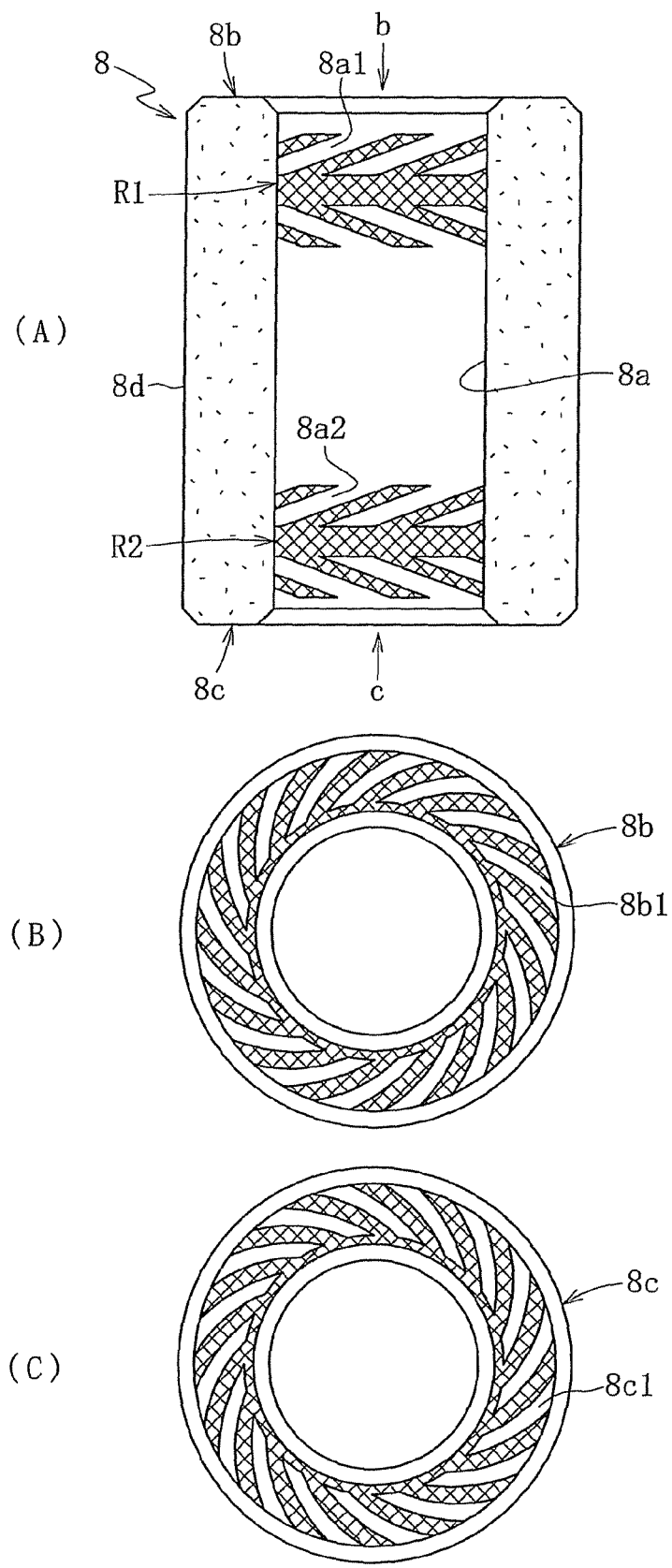
FIG. 3(A) is a sectional view of an inner diameter part shown in FIG. 2.
FIG. 3(B) is a diagram showing a top end of the inner diameter part shown in FIG. 2.
FIG. 3(C) is a diagram showing a bottom end of the inner diameter part shown in FIG. 2.

The inner periphery 8a of the inner diameter part 8 is provided with top and bottom, two areas where to make the radial bearing surfaces of the first radial bearing portion R1 and the second radial bearing portion R2 so that they are axially separated from each other. For their dynamic pressure generating portions, the two areas have respective dynamic pressure generating grooves 8a1 and 8a2 of herringbone shape such as shown in FIG. 3(A), for example. In the shown example, both the dynamic pressure generating grooves 8a1 and 8a2 have a symmetrical shape about their axial centers. Nevertheless, for example, the upper dynamic pressure generating grooves 8a1 may be configured so that the grooves lying above its axial center have an axial width greater than that of the grooves lying below. This can provide an axially downward pressing force (pumping force) to the lubricating oil when the shaft member 2 is rotated. The dynamic pressure generating grooves 8a1 and 8a2 may be formed in the outer periphery 2a of the shaft member 2, opposite across the radial bearing clearance. The dynamic pressure generating grooves may be formed in other known shapes such as a spiral shape.

A thrust bearing surface of the first thrust bearing portion T1 is formed on part or all of the annular area at the top end 8b of the inner diameter part 8. For its dynamic pressure generating portion, the area to make this thrust bearing surface has dynamic pressure generating grooves 8$b$1 of spiral shape such as shown in FIG. 3(B), for example. Similarly, a thrust bearing surface of the second thrust bearing portion T2 is formed on part or all of the annular area at the bottom end 8$c$ of the inner diameter part 8. For its dynamic pressure generating portion, the area to make this thrust bearing surface has dynamic pressure generating grooves 8$c$1 of spiral shape such as shown in FIG. 3(C), for example. The dynamic pressure generating portions may be formed on the opposite surfaces across the thrust bearing clearances, i.e., on the bottom end 9$b$ of the first flange part 9 and the top end 10$b$ of the second flange part 10. Aside from the foregoing spiral shape, the dynamic pressure generating grooves may be formed in a herringbone shape and the like.

Note that the dynamic pressure generating grooves 8$a$1, 8$a$2, 8$b$1, and 8$c$1 descried above may be die-formed simultaneously with the molding of the inner diameter part 8. They can be easily formed at low cost, for example, by forming their die parts on the molding dies for molding the inner diameter part 8 in advance, at areas corresponding to the dynamic pressure generating grooves.

The inner diameter part 8 may be made of any base resin regardless of thermoplastic resin or thermosetting resin as long as it is capable of injection molding and satisfies such requirements as heat resistance, oil resistance, and mechanical strength. For example, one type or a mixture of a plurality of types selected from among general-purpose plastics, general-purpose engineering plastics, and super engineering plastics to be illustrated later may be used. It is desirable to mix at least one of super engineering plastics which are excellent in the foregoing property requirements. The base resin may contain one or more of various fillers including reinforcing agents, lubricating oils, and conductive agents.

The available general-purpose plastics include, for example, polyethylene (PE), polypropylene (PP), polystyrene (PS), and epoxy (EP). The available general-purpose engineering plastics include, for example, polyacetal (POM), polyethylene terephthalate (PET), polybutylene terephthalate (PBT), and polycarbonate (PC).

The available super engineering plastics include, for example, polyphenylene sulfide (PPS), polyether ketone (PEK), polyether ether ketone (PEEK), polyetherimide (PEI), polyether sulfone (PES), polyamideimide (PAI), thermoplastic polyimide (TPI), thermosetting polyimide, polyamide (PA), aromatic polyamides such as polyamide 6T and polyamide 9T, and fluorine-based copolymer resins such as tetrafluoroethylene-hexafluoropropylene copolymer (PFA) and ethylene-tetrafluoroethylene copolymer (ETFE).

By kneading techniques that are typically used for mixing resins, such as dry blending and melt kneading, the foregoing base resin is mixed with pore forming materials and fillers to create a resin composition (injection material) for molding the inner diameter part 8. The pore forming materials may be ones that have a melting point higher than the molding temperature of the selected base resin so as not to melt during molding, and that can be removed with a solvent to which the base resin has no solubility, after they are compounded with the base resin and the inner diameter part 8 is molded. Of these, slightly alkaline substances can be suitably used in particular since they have water solubility to facilitate the removal operation after molding, and can be used as rust inhibitors.

The available pore forming materials include organic alkali metal salts typified by sodium benzoate, sodium acetate, sodium sebacate, sodium succinate, and sodium stearate, and inorganic alkali metal salts typified by potassium carbonate, sodium molybdate, potassium molybdate, sodium tungstate, sodium triphosphate, and sodium pyrophosphate. Of these, sodium benzoate, sodium acetate, and sodium sebacate are particularly preferable since they have a high melting point, can improve the flexibility of selection of the base material, and have excellent water solubility. One of these metal salts may be used alone, or two or more may be mixed for use. Note that the pore forming materials in use desirably have an average grain size of 0.1 to 500 μm. The reason is that if the grain sizes of the pore forming materials, i.e., the sizes of the pores formed in the inner diameter part 8 fall to or below 0.1 μm, the surface tension of the lubricating oil precludes smooth supply of the lubricating oil to the bearing clearances. If the pore sizes reach or exceed 500 μm, the smaller surface areas fail to provide the intended bearing rigidity.

The compounding ratio of the pore forming materials is preferably 30 vol % to 90 vol % with respect to the total amount including the base resin, the pore forming materials, and the fillers, and more preferably, 40 vol % to 60 vol %. The reason is that a sufficient amount of pores cannot be formed at or below 30 vol %, and intended mechanical strength cannot be obtained at or above 90 vol %.

The outer diameter part 7 is made of a nonporous body of resin (solid resin) in a generally cylindrical shape. The outer periphery of this outer diameter part 7 is provided with a mounting surface intended for the bracket 5 shown in FIG. 1. This mounting surface is fixed to the inner periphery of the bracket 5 by such means as adhesion, press-fitting, and press-fitting with adhesion.

Like the inner diameter part 8, the outer diameter part 7 may be made of any base resin regardless of thermoplastic resin or thermosetting resin as long as it is capable of injection molding and satisfies such requirements as heat resistance, oil resistance, and mechanical strength. One type or a mixture of a plurality of types selected from among the foregoing general-purpose plastics, general-purpose engineering plastics, and super engineering plastics may be used. The base resin is compounded with one, two, or more of various fillers including reinforcing agents (regardless of form, whether fibrous or powder etc.), lubricants, and conductive agents.

The foregoing inner diameter part 8 is fixed to the inner periphery of this outer diameter part 7. The two parts may be fixed by appropriate means such as welding, adhesion, press-fitting, and press-fitting with adhesion. In the present configuration example, they are fixed by welding, where the interface (the outer periphery 8$d$ of the inner diameter part 8 and part of the area of the inner periphery 7$a$ of the outer diameter part 7) is melted to provide a high bonding strength therebetween, requiring a short time for fixation (the welded areas are shown in dotted lines in the diagram). Specific methods available for the welding include publicly known methods such as ultrasonic welding, laser welding, vibration welding, high-frequency induction heating welding, and hot plate welding, which are selected as appropriate depending on the compositions, shapes, and the like of the outer diameter part 7 and the inner diameter part 8.

The first flange part 9 and the second flange part 10 are both made of brass or other soft metal materials, or other metal materials, or resin materials, in a ring shape separately from the shaft member 2. They are fixed to predetermined positions of the shaft member 2 by adhesion. Here, the adhesive applied to the shaft member 2 is filled into and cured in the circumferential grooves 2$c$, or adhesive pockets. This improves the adhesive strength of the flange parts 9 and 10 to the shaft member 2.

The outer periphery 9a of the first flange part 9 and the inner periphery 7a of the top opening of the outer diameter part 7 create a first seal space S1 of predetermined capacity therebetween. The outer periphery 10a of the second flange part 10 and the inner periphery 7a of the bottom opening of the outer diameter part 7 create a second seal space S2 of predetermined capacity therebetween. In the present embodiment, both the outer periphery 9a of the first flange part 9 and the outer periphery 10a of the second flange part 10 are shaped as tapered surfaces which gradually decrease in diameter toward the respective outer sides of the bearing device. Consequently, both the seal spaces S1 and S2 have a tapered shape such that they gradually decrease in diameter toward each other (toward the inner side of the bearing member 6). When the shaft member 2 is rotated, the lubricating oil in both the seal spaces S1 and S2 is drawn into directions where the seal spaces get narrower (toward the inner side of the bearing member 6) by the drawing action from the capillary force and by the drawing action from the centrifugal force during rotation. This consequently prevents leakage of the lubricating oil from inside the device effectively. For reliable prevention of the oil leakage, as shown in the enlarged views of FIG. 2 (the enlarged views shown to the left in the diagram), the top end 7b and the bottom end 7c of the outer diameter part 7, the top end 9c of the first flange part 9, and the bottom end 10c of the second flange part 10 may be each provided with a coating 11 of an oil repellant.

The first and second seal spaces S1 and S2 have a buffering function for absorbing a volumetric change of the lubricating oil filled in the internal space of the bearing member 6 due to temperature variations. Within the intended range of temperature variations, the oil surfaces remain in the two seal spaces S1 and S2 all the time. To achieve this, the total sum of the capacities of the two seal spaces S1 and S2 is set to be at least greater than the amount of volumetric change of the lubricating oil filled in the internal space due to temperature variations.

After the shaft member 2 is inserted into the bearing member 6 (inner diameter part 8) in the manner as described above, the first flange part 9 and the second flange part 10 are fixed to the predetermined positions of the shaft member 2 by adhesion, with the inner diameter part 8 therebetween. When the assembly is thus completed, a lubricating fluid such as a lubricating oil is filled into the internal space of the bearing member 6 that is sealed by the two flange parts 9 and 10, including the internal pores of the inner diameter part 8.

The lubricating oil is applied to the fluid dynamic bearing device, for example, by immersing the unoiled fluid dynamic bearing device into the lubricating oil in a vacuum bath, and then releasing it to the atmospheric pressure. The fluid dynamic bearing device 1 of the present configuration example is opened at both ends of the bearing member 6. As compared to the configuration with a closed end (see patent document 1), the air inside the internal space can thus be replaced with the lubricating oil with reliability, so that troubles ascribable to remaining air, such as oil leakage at high temperatures, can be avoided without fail. Aside from the foregoing method of oil application utilizing a reduced pressure, oiling at atmospheric pressure is also possible (such as force feed of the lubricating oil). The oiling system and process can thus be simplified for reduced manufacturing cost.

Incidentally, if the bearing member 6 (outer diameter part 7) is formed in a generally symmetrical shape about the axial center as in the present configuration example, it may be accidentally assembled upside down. It is therefore desirable, though not shown in the drawings, that an identification mark for top-bottom distinction be formed in the outer periphery of the outer diameter part 7 or the like. Such an identification mark may be formed, for example, simultaneously with the molding of the outer diameter part 7.

In the fluid dynamic bearing device 1 of the foregoing configuration, when the shaft member 2 is rotated, the top and bottom, two separated areas of the inner periphery 8a of the inner diameter part 8 where to make the radial bearing surfaces are opposed to the outer periphery 2a of the shaft member 2 across respective radial bearing clearances. With the rotation of the shaft member 2, the oil films formed in the radial bearing clearances then increase in rigidity due to the dynamic pressure effects of the dynamic pressure generating grooves, and the shaft member 2 is thus rotatably supported in the radial direction without contact. This forms the first radial bearing portion R1 and the second radial bearing portion R2 which rotatably support the shaft member 2 in the radial direction without contact.

Moreover, when the shaft member 2 is rotated, the area of the top end 8b of the inner diameter part 8 where to make a thrust bearing surface is opposed to the bottom end 9b of the first flange part 9 across a predetermined thrust bearing clearance. The area of the bottom end 8c of the inner diameter part 8 where to make a thrust bearing surface is opposed to the top end 10b of the second flange part 10 across a predetermined thrust bearing clearance. With the rotation of the shaft member 2, the oil films formed in the thrust bearing clearances then increase in rigidity due to the dynamic pressure effects of the dynamic pressure generating grooves, and the shaft member 2 is thus rotatably supported in the thrust direction without contact. This forms the first thrust bearing portion T1 and the second thrust bearing portion T2 which rotatably support the shaft member 2 in the thrust direction without contact.

As described above, according to the present invention, the inner diameter part 8 and the outer diameter part 7 are both made of a resin. As compared to the conventional configuration where the inner diameter part is made of sintered metal, the simplified manufacturing steps and the lowered material cost therefore allow a reduction of the manufacturing cost. In addition, as compared to the conventional configuration where the inner diameter part made of sintered metal and the outer diameter part made of a resin are fixed to each other by adhesion, the interface melted by welding can increase the bonding strength between the two easily. It is therefore possible to provide a fluid dynamic bearing device 1 having excellent impact load resistance.

Moreover, in the present configuration example in particular, the inner diameter part 8, which has the radial bearing surfaces and the thrust bearing surfaces, is made of a porous oil-impregnated resin. When the bearing is in operation, the lubricating oil retained in the internal pores therefore exudes to the radial bearing clearances and the thrust bearing clearances, allowing an abundant supply of the lubricating oil into these bearing clearances for high lubricating performance. This inner diameter part 8 made of porous resin can be formed, for example, by simply injection molding a resin composition containing a pore forming material, followed by the removal of the pore forming material. Consequently, as compared to the conventional configuration where the inner diameter part 8 is made of sintered metal, the manufacturing steps can also be simplified to reduce the cost of the fluid dynamic bearing device 1. Furthermore, since the outer diameter part 7 is made of a nonporous resin, it is possible to avoid oil leakage to outside the bearing due to the exudation of the lubricating oil from the pores of the inner diameter part 8, and the resulting drop in the bonding strength with the bracket 5.

As has been described, in the fluid dynamic bearing device 1 according to the present invention, the bearing member 6 can be formed at low cost, and this bearing member 6 has high impact load resistance as well. In the mean time, the resin compositions for forming for the inner diameter part 8 and the outer diameter part 7 can be suitably selected to improve the lubricating performance and avoid contamination to the surrounding environment.

While the foregoing description has dealt with the case where the inner diameter part 8 is made of a porous oil-impregnated resin, the inner diameter part 8 may be made of a not-porous or nonporous oil-impregnated resin. Examples of the nonporous oil-impregnated resin include one that is solidified (cured) with a lubricating component (lubricating oil or lubricating grease) distributed and retained in its base resin. The types of the component resin, lubricating oil, and/or lubricating grease are not particularly limited in use. Among specific examples of the resin component of this oil-impregnated resin are thermoplastic resins such as ultra high molecular weight polyolefin, polyphenylene sulfide (PPS), and liquid crystal polymer (LCP). Among specific examples of the lubricating component are lubricating oils such as mineral oil, synthetic hydrocarbon oil, and ester oil. When a thermoplastic resin is used for the resin and lubricating grease is used for the lubricating component, it is preferred to employ a lubricating grease that has a dropping point higher than the melting point of the thermoplastic resin. If necessary, these resin materials are compounded with one, two, or more of various fillers including reinforcing agents (regardless of form, whether fibrous or powder etc.), lubricants, and conductive agents.

Although not shown in the drawings, the outer diameter part 7 may also be molded integrally with the bracket 5 shown in FIG. 1 for a further reduction in cost. In this case, the stator coil 4a shown in FIG. 1 is fixed to the outer diameter part 7. Then, the outer diameter part 7 can be made of a non-porous resin to avoid oil leakage, thereby preventing the stator coil 4a from coming off.

Up to this point, one configuration example of the fluid dynamic bearing device according to the present invention has been described. The present invention is not limited in application to the foregoing fluid bearing apparatus 1, however, and may be suitably applied to fluid dynamic bearing devices of other modes as well. Hereinafter, a description will be given of other configuration examples of the fluid dynamic bearing device, in which components and elements having the same functions or operations as those shown in FIG. 2 do will be designated by like reference numerals, and redundant description will be omitted.

Figure 4:
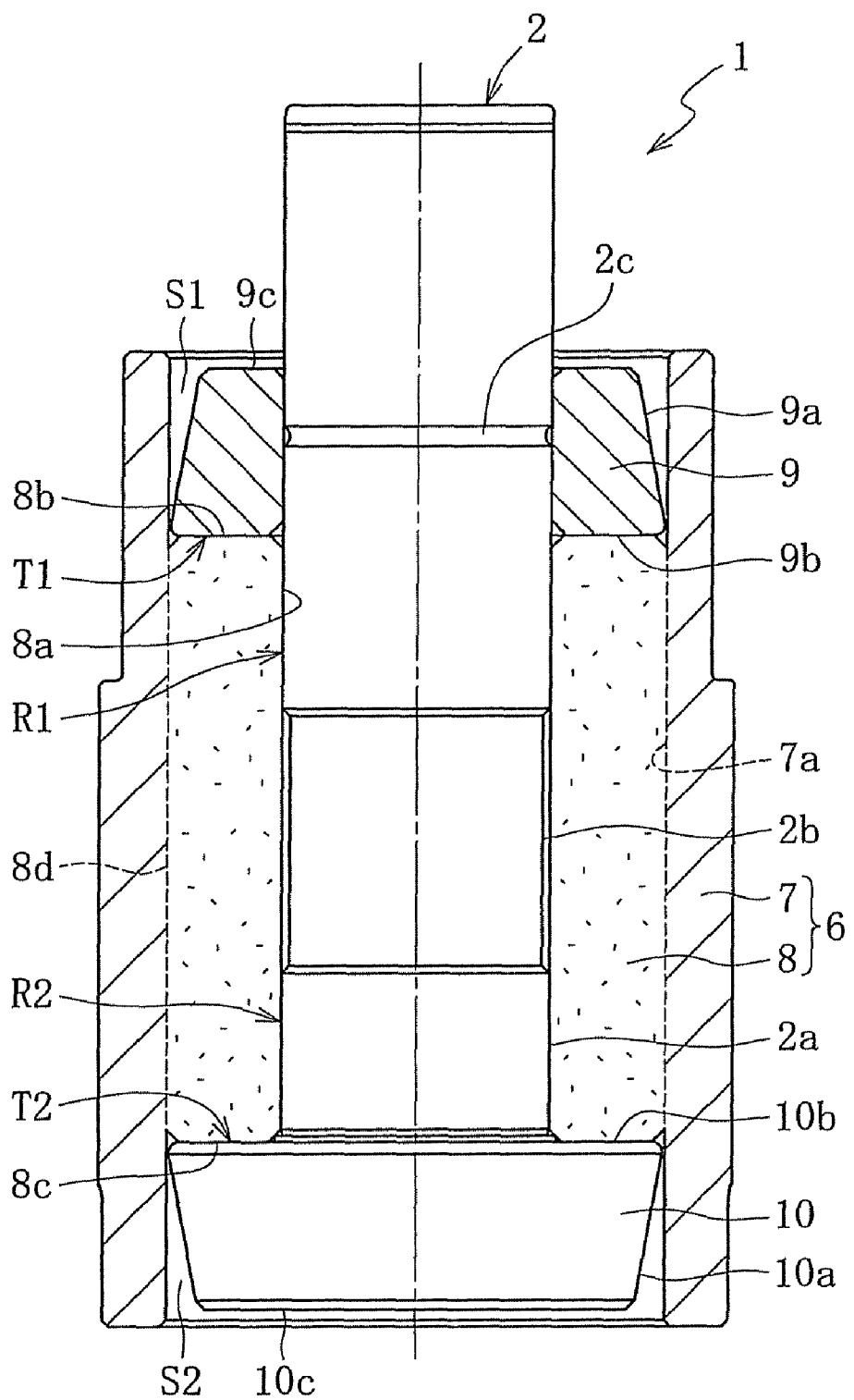
FIG. 4 is a sectional view showing a second configuration example of the first embodiment of the fluid dynamic bearing device.

FIG. 4 shows a second configuration example of the first embodiment of the fluid dynamic bearing device according to the present invention. The fluid dynamic bearing device 1 shown in the diagram differs from the configuration example shown in FIG. 2 primarily in that either one of the first flange part 9 and the second flange part 10 (in FIG. 4, the second flange part 10) is formed integrally with the shaft member 2. This makes it possible to suppress variations in the assembly precision between the shaft member 2 and the flange part 10 (such as squareness) when fixing the flange part 10, and thus facilitate precision management during assembly.

Figure 5:
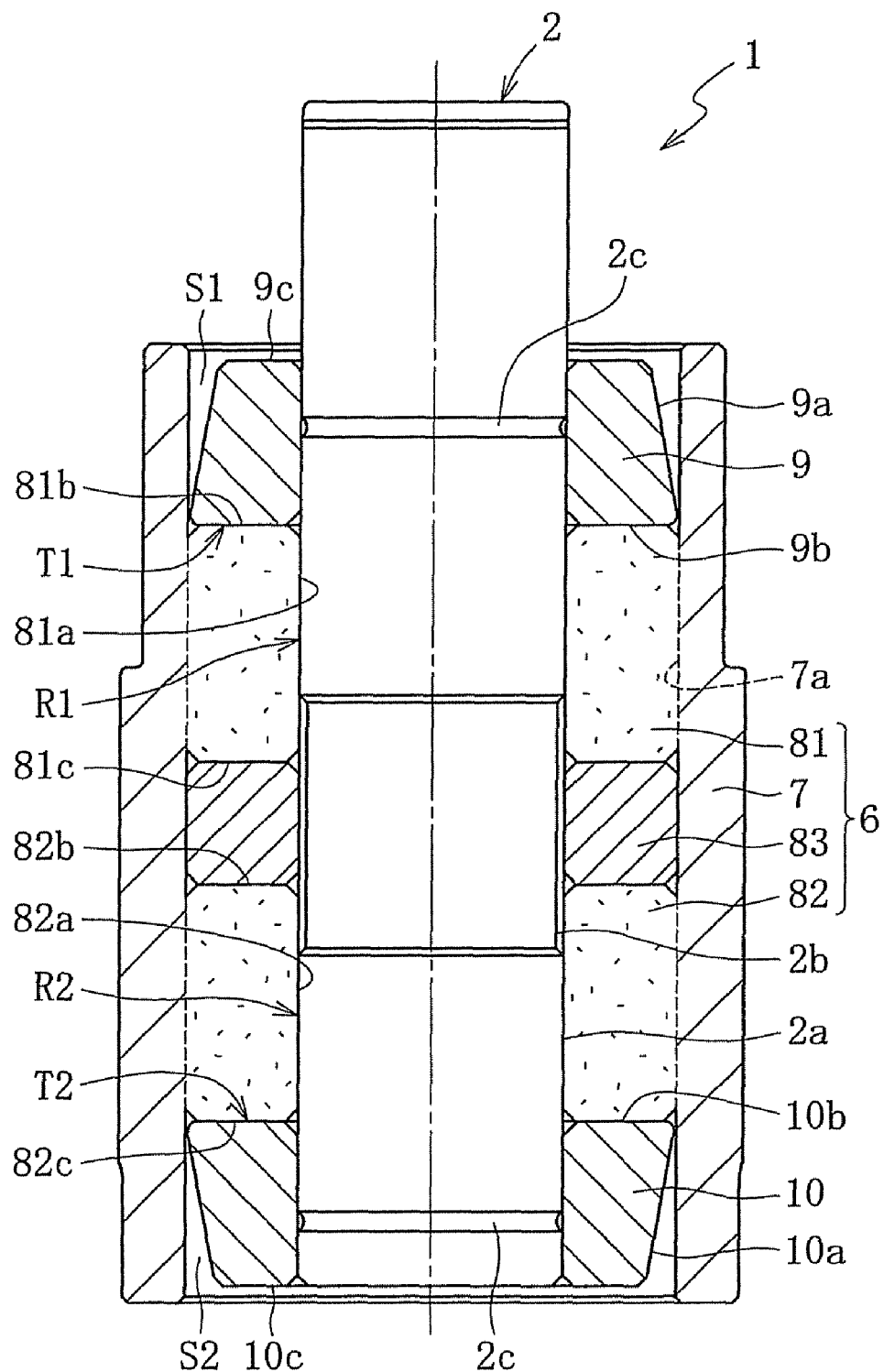
FIG. 5 is a sectional view showing a third configuration example of the first embodiment of the fluid dynamic bearing device.

FIG. 5 shows a third configuration example of the first embodiment of the fluid dynamic bearing device according to the present invention. The fluid dynamic bearing device shown in the diagram differs from the configuration example shown in FIG. 2 primarily in that: the inner diameter part 8 is composed of a top inner diameter part 81 and a bottom inner diameter part 82; and an additional spacer part 83 is arranged to fill the space between the two inner diameter parts 81 and 82. In the present configuration example, a first radial bearing portion R1 is formed between the inner periphery 81a of the top inner diameter part 81 and the outer periphery 2a of the shaft member 2. A second radial bearing portion R2 is formed between the inner periphery 82a of the bottom inner diameter part 82 and the outer periphery 2a of the shaft member 2. Moreover, a first thrust bearing portion T1 is formed between the top end 81b of the top inner diameter part 81 and the bottom end 9b of the first seal part 9. A second thrust bearing portion T2 is formed between the bottom end 82c of the bottom inner diameter part 82 and the top end 10b of the second seal part 10.

Figure 6:
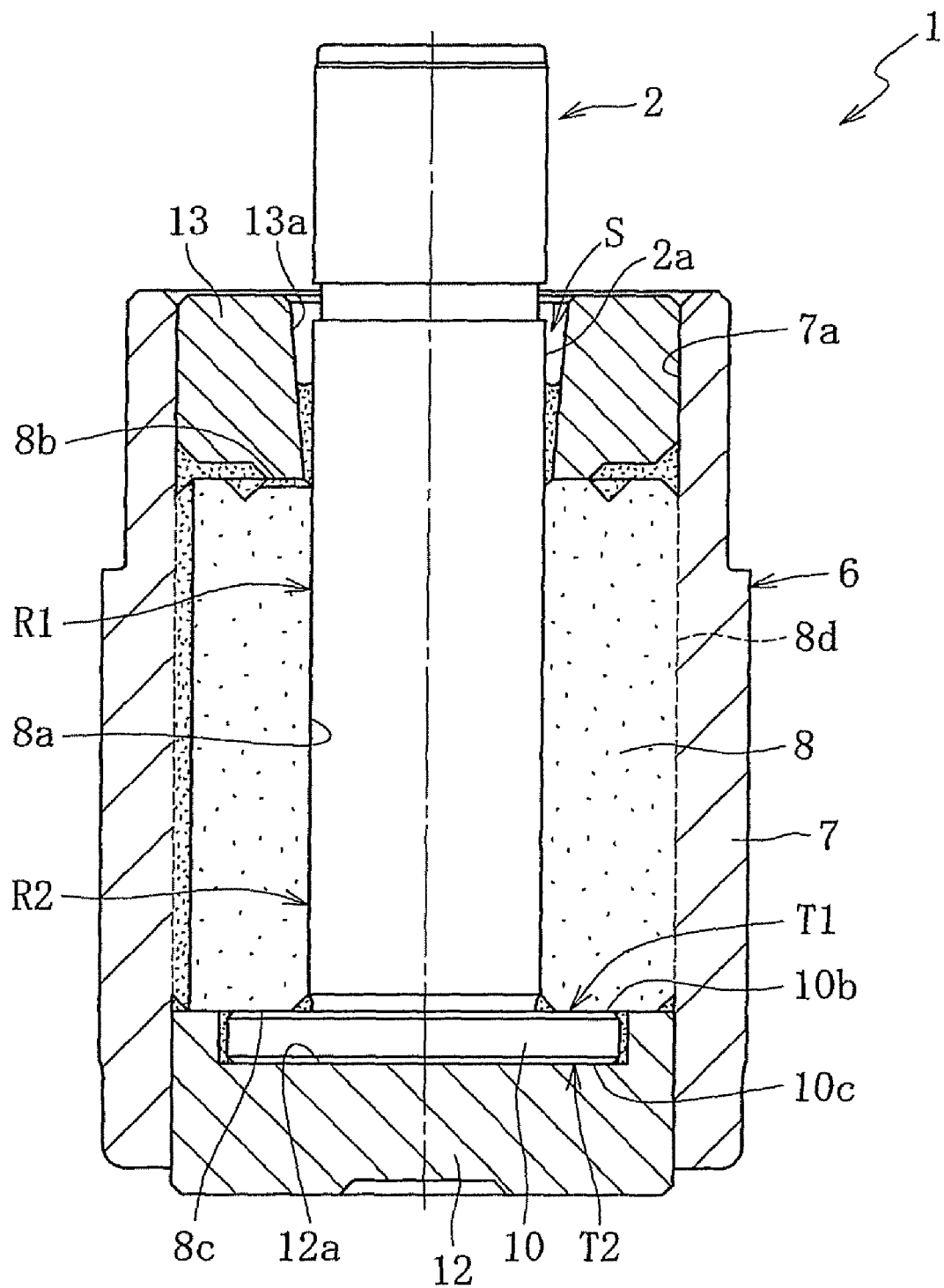
FIG. 6 is a sectional view showing a fourth configuration example of the first embodiment of the fluid dynamic bearing device.

FIG. 6 shows a fourth configuration example of the first embodiment of the fluid dynamic bearing device according to the present invention. The fluid dynamic bearing device shown in the diagram differs from the foregoing configuration examples primarily in that: the first and second thrust bearing portions T1 and T2 are formed on both ends of a flange part 10 which is formed on the shaft member 2; and a seal space S is formed only between the outer periphery 2a of the shaft member 2 and the inner periphery 13a of a seal member 13 which is fixed to the inner periphery 7a at the top end of the outer diameter part 7 while the bottom opening of the bearing member 6 is closed with a lid member 12. In this configuration example, the thrust bearing portions may be configured as a so-called pivot bearing, in which the shaft member 2 is formed in a convex spherical shape at the bottom end so that this shaft end is supported by contact with the top end of the lid member 12.

Figure 7:
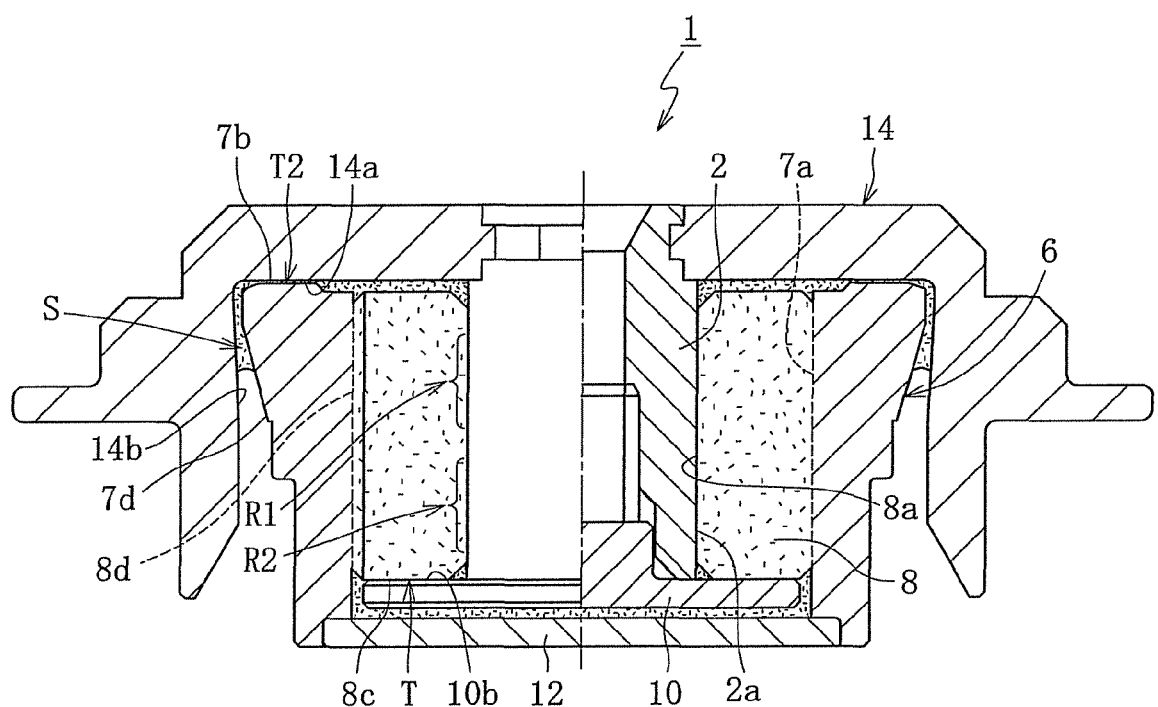
FIG. 7 is a sectional view showing a fifth configuration example of the first embodiment of the fluid dynamic bearing device.

FIG. 7 shows a fifth configuration example of the first embodiment of the fluid dynamic bearing device according to the present invention. The fluid dynamic bearing device 1 shown in the diagram structurally differs from the foregoing configuration examples primarily in that: the second thrust bearing portion T2 is formed between the bottom end 14a of a hub part 14 fixed to the shaft member 2 and the top end 7b of the outer diameter part 7; and a seal space S is formed between the outer periphery 7d of the outer diameter part 7 and the inner periphery 14b of the hub part 14.

While the foregoing description has dealt with the cases where the bearing member 6 is formed by fixing the inner diameter part 8 and the outer diameter part 7 by welding, the means for forming the bearing member is not limited to such techniques. More specifically, both the inner diameter part and the outer diameter part of the bearing member may be made of a resin, and either one of the inner diameter part and the outer diameter part may be used as an insert for injection molding. Hereinafter, a description will be given of specific configuration examples of the fluid dynamic bearing device with a bearing member of such configuration.

Figure 8:
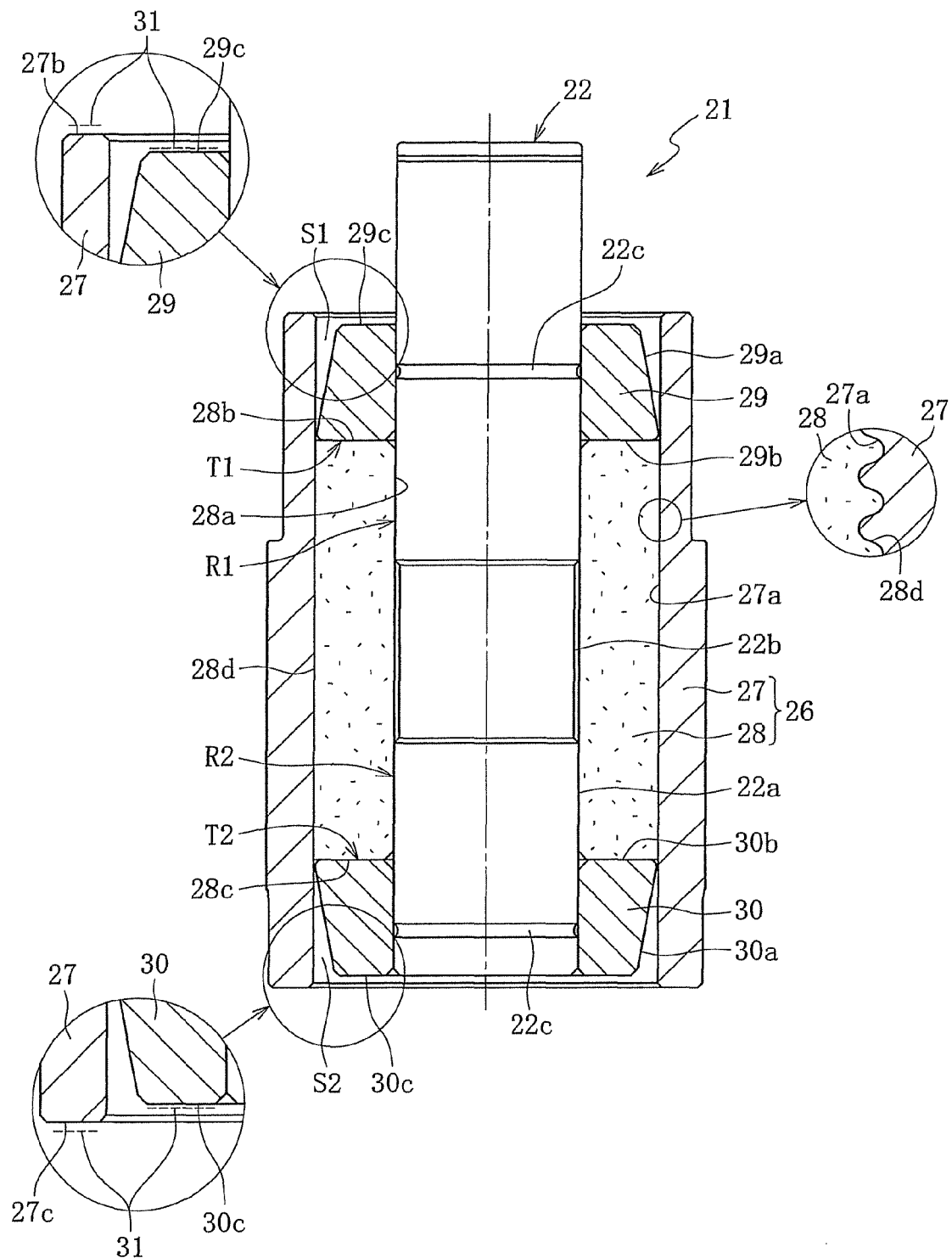
FIG. 8 is a sectional view showing a first configuration example of a second embodiment of the fluid dynamic bearing device.

FIG. 8 shows a first configuration example of a second embodiment of the fluid dynamic bearing device according to the present invention. The fluid dynamic bearing device 21 shown in the diagram includes, as its primary components, a shaft member 22 on the rotating side and a bearing member 26 on the stationary side.

The shaft member 22 is made of metal material such as stainless steel. The entire shaft member 22 is shaped like a shaft of generally uniform diameter, with a relief portion 22b of slightly smaller diameter in the midsection. The outer periphery 22a of the shaft member 22 has recesses, such as circumferential grooves 22c, in positions where first and second flange parts 29 and 30 are fixed to.

The bearing member 26 is composed of an inner diameter part 28 of cylindrical shape which is made of a resin porous body (porous resin), and an outer diameter part 27 which is injection molded out of a resin with the inner diameter part 28 as an insert. The inner diameter part 28 of porous resin is formed, for example, by injection molding a resin composition that contains a pore forming material, and then removing the pore forming material with water, alcohol, or other solvents. Aside from the injection molding mentioned above, the inner diameter part 28 may also be molded by using such techniques as compression molding, extrusion molding, blow molding, vacuum molding, and transfer molding, depending on the shape of the inner diameter part 28, the selected resin material, etc.

Figure 9:
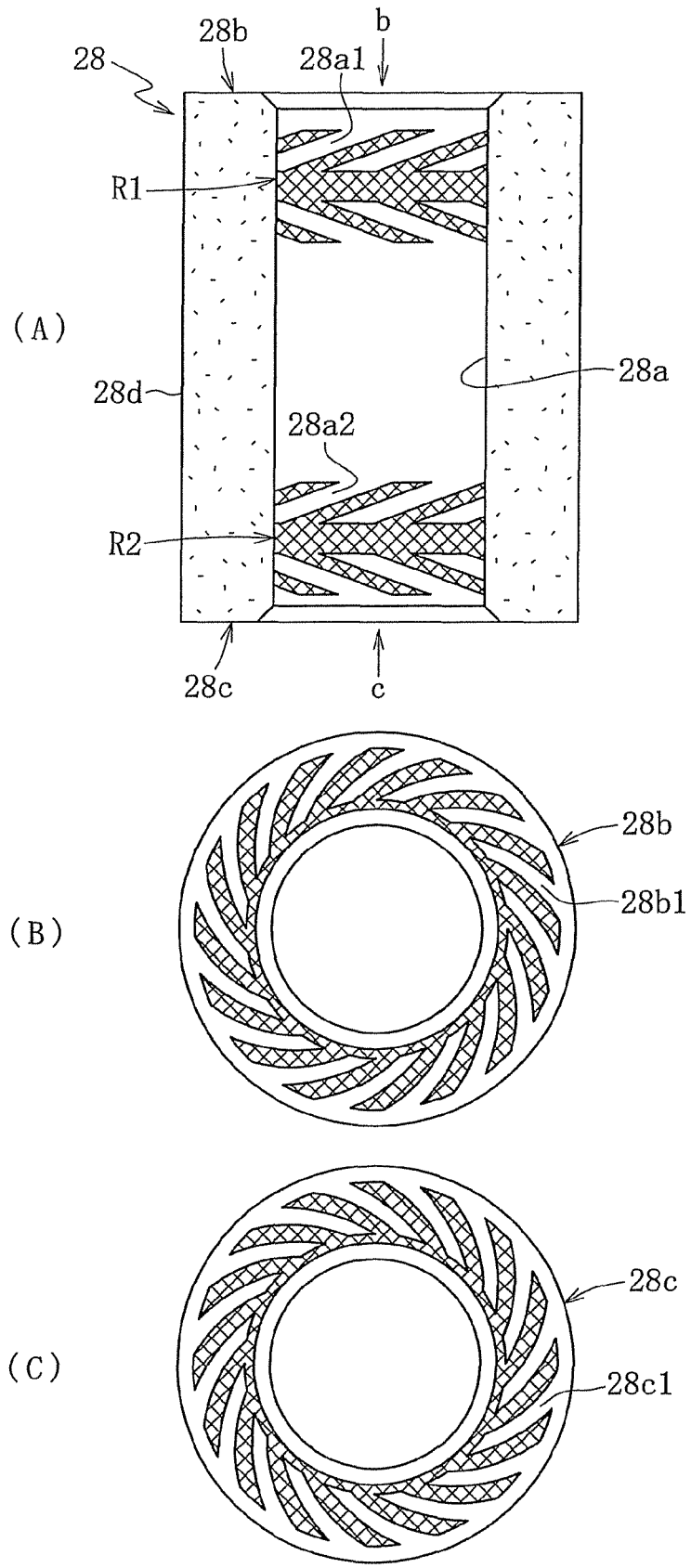
FIG. 9(A) is a sectional view of an inner diameter part shown in FIG. 8.
FIG. 9(B) is a diagram showing a top end of the inner diameter part shown in FIG. 8.
FIG. 9(C) is a diagram showing a bottom end of the inner diameter part shown in FIG. 8.

The inner periphery 28*a* of the inner diameter part 28 is provided with top and bottom, two areas where to make the radial bearing surfaces of a first radial bearing portion R1 and a second radial bearing portion R2 so that they are axially separated from each other. For their dynamic pressure generating portions, the two areas have respective dynamic pressure generating grooves 28*a*1 and 28*a*2 of herringbone shape such as shown in FIG. 9(A). In the shown example, both the dynamic pressure generating grooves 28*a*1 and 28*a*2 have a symmetrical shape about their axial centers. Nevertheless, for example, the upper dynamic pressure generating grooves 28*a*1 may be configured so that the grooves lying above the axial center have an axial width greater than that of the grooves lying below. This gives an axially downward pressing force (pumping force) to the lubricating oil when the shaft member 22 is rotated. The dynamic pressure generating grooves 28*a*1 and 28*a*2 may be formed in the outer periphery 22*a* of the shaft member 22, opposite across a radial bearing clearance. Aside from the herringbone shape, the dynamic pressure generating grooves may be formed in any other shapes such as a spiral shape.

Now, a thrust bearing surface of a first thrust bearing portion T1 is formed on part or all of the annular area at the top end 28*b* of the inner diameter part 28. For its dynamic pressure generating portion, the area to make this thrust bearing surface has dynamic pressure generating grooves 28*b*1 of spiral shape such as shown in FIG. 9(B). Similarly, a thrust bearing surface of a second thrust bearing portion T2 is formed on part or all of the annular area at the bottom end 28*c* of the inner diameter part 28. For its dynamic pressure generating portion, the area to make this thrust bearing surface has dynamic pressure generating grooves 28*c*1 of spiral shape such as shown in FIG. 9(C). The dynamic pressure generating portions may be formed in the opposite surfaces across the thrust bearing clearances, i.e., in the bottom end 29*b* of the first flange part 29 and the top end 30*b* of the second flange part 30. Aside from the foregoing spiral shape, the dynamic pressure generating grooves may be formed in any shape such as a herringbone shape.

The inner diameter part 28 may be made of any base resin regardless of thermoplastic resin or thermosetting resin as long as it is capable of injection molding and satisfies such requirements as heat resistance, oil resistance, and mechanical strength. For example, one type or a mixture of a plurality of types selected from among general-purpose plastics, general-purpose engineering plastics, and super engineering plastics to be illustrated later may be used. It is desirable to mix at least one of super engineering plastics which are excellent in the foregoing property requirements. The base resin may contain one or more of various fillers including reinforcing agents, lubricating oils, and conductive agents.

The available general-purpose plastics include, for example, polyethylene (PE), polypropylene (PP), polystyrene (PS), and epoxy (EP). The available general-purpose engineering plastics include, for example, polyacetal (POM), polyethylene terephthalate (PET), polybutylene terephthalate (PBT), and polycarbonate (PC).

The available super engineering plastics include, for example, polyphenylene sulfide (PPS), polyether ketone (PEK), polyether ether ketone (PEEK), polyetherimide (PEI), polyether sulfone (PES), polyamideimide (PAI), thermoplastic polyimide (TPI), thermosetting polyimide, polyamide (PA), aromatic polyamides such as polyamide 6T and polyamide 9T, and fluorine-based copolymer resins such as tetrafluoroethylene-hexafluoropropylene copolymer (PFA) and ethylene-tetrafluoroethylene copolymer (ETFE).

By kneading techniques that are typically used for mixing resins, such as dry blending and melt kneading, the foregoing base resin is mixed with pore forming materials and fillers to create a resin composition (injection material) The pore forming materials may be ones that have a melting point higher than the molding temperature of the selected base resin so as not to melt during molding, and that can be removed by using a solvent to which the base resin has no solubility, after they are compounded with the base resin and the inner diameter part 28 is molded. Of these, slightly alkaline substances can be suitably used in particular since they have water solubility to facilitate the removal operation after molding, and can be used as rust inhibitors.

The available pore forming materials include organic alkali metal salts typified by sodium benzoate, sodium acetate, sodium sebacate, sodium succinate, and sodium stearate, and inorganic alkali metal salts typified by potassium carbonate, sodium molybdate, potassium molybdate, sodium tungstate, sodium triphosphate, and sodium pyrophosphate. Of these, sodium benzoate, sodium acetate, and sodium sebacate are particularly preferable since they have a high melting point, can improve the flexibility of selection of the base material, and have excellent water solubility. One of these metal salts may be used alone, or two or more may be mixed for use. Note that the pore forming materials in use desirably have an average grain size of 0.1 to 500 μm. The reason is that if the grain sizes of the pore forming materials, i.e., the sizes of the pores formed in the inner diameter part 28 fall to or below 0.1 μm, the surface tension of the lubricating oil precludes smooth supply of the lubricating oil to the bearing clearances. If the pore sizes reach or exceed 500 μm, the smaller surface areas fail to provide the intended bearing rigidity.

The compounding ratio of the pore forming materials is preferably 30 vol % to 90 vol % with respect to the total amount including the base resin, the pore forming materials, and the fillers. The ratio is more preferably 10 vol % to 30 vol % when suppressing the amount of oil impregnated to a minimum, and 40 vol % to 60 vol % when increasing the amount of oil impregnated. The reason is that a sufficient amount of pores cannot be formed at or below 10 vol %, and intended mechanical strength cannot be obtained at or above 90 vol %.

The outer diameter part 27 is a resin nonporous body formed in a generally cylindrical shape, being injection molded with the inner diameter part 28 as an insert. The outer periphery of this outer diameter part 27 has a mounting surface for the bracket 5 shown in FIG. 1. This mounting surface is fixed to the inner periphery of the bracket 5 by such means as press-fitting, adhesion, and press-fitting with adhesion.

Like the inner diameter part 28, the outer diameter part 27 may be made of any base resin regardless of thermoplastic resin or thermosetting resin as long as it is capable of injection molding and satisfies such requirements as heat resistance, oil resistance, and mechanical strength. One type or a mixture of a plurality of types selected from among the foregoing general-purpose plastics, general-purpose engineering plastics, and super engineering plastics may be used. The base resin is compounded with one, two, or more of various fillers including reinforcing agents (regardless of form, whether fibrous or powder etc.), lubricants, and conductive agents, thereby creating a resin composition for forming the outer diameter part 27. In the present configuration example, the resin composition for forming the outer diameter part 27 is created so as to have a melting point higher than that of the resin composition that forms the inner diameter part 28.

As above, if the outer diameter part 27 is made of a resin composition having a higher melting point than that of the inner diameter part 28, the molding of the outer diameter part 27 melts the surface (the outer periphery 28d) of the inner diameter part 28, an insert placed inside the die, into melt bonding or into an uneven surface such as shown in the enlarged view of FIG. 8 (the enlarged view shown to the right in the diagram). Consequently, the resin composition injected gets into the asperities in the outer periphery 28d so that the outer diameter part 27 and the inner diameter part 28 are firmly bonded to each other by a so-called anchoring effect. As a result, there is provided a bearing member 26 having excellent impact resistance.

For improved bonding strength between the outer diameter part 27 and the inner diameter part 28, resin may be injected to cover the top and bottom ends 28b and 28c of the inner diameter 28 when molding the outer diameter part 27. For even higher bonding strength therebetween, for example, an inner diameter part 28 that has intermittent or continuous annular grooves in its outer periphery 28d may be used as the insert (not shown).

In the present configuration example, although not shown in the drawings, the outer diameter part 27 is injection molded by using an injection molding die that has die parts corresponding to the configuration of the dynamic pressure generating grooves in the inner periphery 28a, the top end 28b, and the bottom end 28c of the inner diameter part 28, respectively. As mentioned previously, the outer diameter part 27 is made of a resin composition having a higher melting point than that of the inner diameter part 28. When the inner diameter part 28 is put in the molding die, the surfaces 28a to 28c of the inner diameter part 28 can thus be melted (softened) to the surface configuration of the molding die as well as the outer periphery 28d is. This makes it possible to form the foregoing dynamic pressure generating grooves 28a1, 28a2, 28b1, and 28c1 simultaneously with the molding of the outer diameter part 27. In this way, according to the present configuration example, the desired shape of the bearing member 26 is all settled at the time of insert molding. The inner diameter part 28 itself may thus have a rough molding precision in the molding phase, so that the inner diameter part 28 can be formed at low cost.

The first flange part 29 and the second flange part 30 are both made of brass, or other soft metal materials, or other metal materials, or resin materials, in a ring shape separately from the shaft member 22. They are fixed to the predetermined positions of the shaft member 22 by adhesion. Here, the adhesive applied to the shaft member 22 is filled into and cured in the circumferential grooves 22c, or adhesive pockets. This improves the adhesive strength of the flange parts 29 and 30 to the shaft member 22.

The outer periphery 29a of the first flange part 29 and the inner periphery 27a of the top opening of the outer diameter part 27 create a first seal space S1 of predetermined capacity therebetween. The outer periphery 10a of the second flange part 30 and the inner periphery 27a of the bottom opening of the outer diameter part 27 create a second seal space S2 of predetermined capacity therebetween. In the present configuration example, both the outer periphery 29a of the first flange part 29 and the outer periphery 30a of the second flange part 30 are shaped as tapered surfaces which gradually decrease in diameter toward the respective outer sides of the bearing device. Consequently, both the seal spaces S1 and S2 have a tapered shape such that they gradually decrease in diameter toward each other (toward the inner side of the bearing member 26). When the shaft member 22 is rotated, the lubricating oil in both the seal spaces S1 and S2 is drawn into directions where the seal spaces get narrower (toward the inner side of the bearing member 26) by the drawing action from the capillary force and by the drawing action from the centrifugal force during rotation. This consequently prevents leakage of the lubricating oil from inside the device effectively. For reliable prevention of the oil leakage, as shown in the enlarged views of FIG. 8 (the enlarged views shown to the left in the diagram), the top end 27b and the bottom end 27c of the outer diameter part 27, the top end 29c of the first flange part 29, and the bottom end 30c of the second flange part 30 may be each provided with a coating 31 of an oil repellant.

The first and second seal spaces S1 and S2 have a buffering function for absorbing a volumetric change of the lubricating oil filled in the internal space of the bearing member 26 due to temperature variations. Within the intended range of temperature variations, the oil surfaces remain in the two seal spaces S1 and S2 all the time. To achieve this, the total sum of the capacities of the two seal spaces S1 and S2 is set to be at least greater than the amount of volumetric change of the lubricating oil filled in the internal space ascribable to temperature variations.

After the shaft member 22 is inserted into the bearing member 26 (inner diameter part 28) in the manner as described above, the first flange part 29 and the second flange part 30 are fixed to the predetermined positions of the shaft member 22 by adhesion, with the inner diameter part 28 therebetween. When the assembly is thus completed, a lubricating fluid such as a lubricating oil is filled into the internal space of the bearing member 26 that is sealed by the two flange parts 29 and 30, including the internal pores of the inner diameter part 28.

The lubricating oil is applied to the fluid dynamic bearing device 21, for example, by immersing the unoiled dynamic bearing device into the lubricating oil in a vacuum bath and then releasing to the atmospheric pressure. The fluid dynamic bearing device 21 of the present configuration example is opened at both ends of the bearing member 26. As compared to the configuration with a closed end (see patent document 1), the air inside the internal space can thus be replaced with the lubricating oil with reliability, so that troubles ascribable to remaining air, such as oil leakage at high temperatures, can be avoided without fail. Aside from the foregoing method of oil application utilizing a reduced pressure, oiling at atmospheric pressure is also possible (such as force feed of the lubricating oil). The oiling system and process can thus be simplified for reduced manufacturing cost.

Incidentally, if the bearing member 26 (outer diameter part 27) is formed in a generally symmetrical shape about the axial center as in the present configuration example, it may be accidentally assembled upside down. It is therefore desirable, though not shown in the drawings, that an identification mark for top-bottom distinction be formed in the outer periphery of the outer diameter part 27 or the like. Such an identification mark may be formed, for example, simultaneously with the molding of the outer diameter part 27.

In the fluid dynamic bearing device 21 of the foregoing configuration, when the shaft member 22 is rotated, the top and bottom, two separated areas of the inner periphery 28a of the inner diameter part 28 where to make the radial bearing surfaces are opposed to the outer periphery 22a of the shaft member 22 across respective radial bearing clearances. With the rotation of the shaft member 22, the oil films formed in the radial bearing clearances then increase in rigidity due to the dynamic pressure effects of the dynamic pressure generating grooves, and the shaft member 22 is thus rotatably supported in the radial direction without contact. This forms the first radial bearing portion R1 and the second radial bearing portion R2 which rotatably support the shaft member 22 in the radial direction without contact.

Moreover, when the shaft member 22 is rotated, the area of the top end 28b of the inner diameter part 28 where to make a thrust bearing surface is opposed to the bottom end 9b of the first flange 29 across a predetermined thrust bearing clearance. The area of the bottom end 28c of the inner diameter part 28 where to make a thrust bearing surface is opposed to the top end 30b of the second flange part 30 across a predetermined thrust bearing clearance. With the rotation of the shaft member 22, the oil films formed in the thrust bearing clearances then increase in rigidity due to the dynamic pressure effects of the dynamic pressure generating grooves, and the shaft member 22 is thus supported in the thrust direction without contact. This forms the first thrust bearing portion T1 and the second thrust bearing portion T2 which rotatably support the shaft member 22 in the thrust direction without contact.

As described above, according to the present invention, the inner diameter part 28 and the outer diameter part 27 are both made of a resin. As compared to the conventional configuration where the inner diameter part 28 is made of sintered metal, the simplified manufacturing steps and the lowered material cost can thus reduce the cost of the bearing member 26. Besides, the bearing member 26 is formed by injection molding the outer diameter part 27 with the inner diameter part 28 as an insert. With the insert molding, the assembly precision between the inner diameter part 28 and the outer diameter part 27 can be improved by simply increasing the die precision. The molding of the outer diameter part 27 and the assembly of the two parts can also be performed in a single process, contributing to a reduced cost of the fluid dynamic bearing device even in this respect.

Moreover, in the present configuration example, the inner diameter part 28 is made of a resin porous body. This resin porous body, as described above, can be formed by injection molding a resin that contains porous forming agents and removing the porous forming agents subsequently. It can thus be manufactured by processes simpler than with sintered metal. Consequently, the inner diameter part 28 made of a resin porous body can lower the manufacturing cost as compared to the conventional configuration where it is made of sintered metal. In addition, the resin porous body can retain lubricating oil and the like in its pores like sintered metal, so that a fluid dynamic bearing device 21 capable of maintaining high rotation performance over a long period can be provided at low cost.

While the foregoing description has dealt with the case where the inner diameter part 28 is made of a porous resin, the inner diameter part 28 may also be made of a nonporous resin. In this case, the inner diameter part 28 is desirably made of a so-called oil-impregnated resin which can supply lubricating oil to the bearing clearances as with the porous resin. Examples of the oil-impregnated resin include one that is solidified (cured) with a lubricating component (lubricating oil or lubricating grease) distributed and retained in its base resin. The types of the component resin, lubricating oil, and/or lubricating grease are not particularly limited in use.

Among specific examples of the resin component of this oil-impregnated resin are thermoplastic resins such as ultra high molecular weight polyolefin, polyphenylene sulfide (PPS), and liquid crystal polymer (LCP). Among specific examples of the lubricating component are lubricating oils such as mineral oil, synthetic hydrocarbon oil, and ester oil. When a thermoplastic resin is used for the resin and lubricating grease is used for the lubricating component, it is preferred to employ a lubricating grease that has a dropping point higher than the melting point of the thermoplastic resin. If necessary, these resin materials are compounded with one, two, or more of various fillers including reinforcing agents (regardless of form, whether fibrous or powder etc.), lubricants, and conductive agents.

The foregoing description has also dealt with the case where the inner diameter part 28 is molded out of a resin composition having a lower melting point than that of the outer diameter part 27, and is used as an insert when injection molding the outer diameter part 27. Nevertheless, the outer diameter part 27 may be molded out of a resin composition having a lower melting point than that of the inner diameter part 28, and may be used as an insert when injection molding the inner diameter part 28.

Moreover, although not shown in the drawings, the outer diameter part 27 may be injection molded integrally with the bracket 5 shown in FIG. 1 for a further reduction in cost.

The present invention is not limited in application to the fluid dynamic bearing device 21 of the foregoing configuration, and may be suitably applied to fluid dynamic bearing devices of other modes as well. Hereinafter, a description will be given of other configuration examples of the fluid dynamic bearing device, in which components and elements having the same functions or operations as those shown in FIG. 8 do will be designated by like reference numerals, and redundant description will be omitted.

Figure 10:
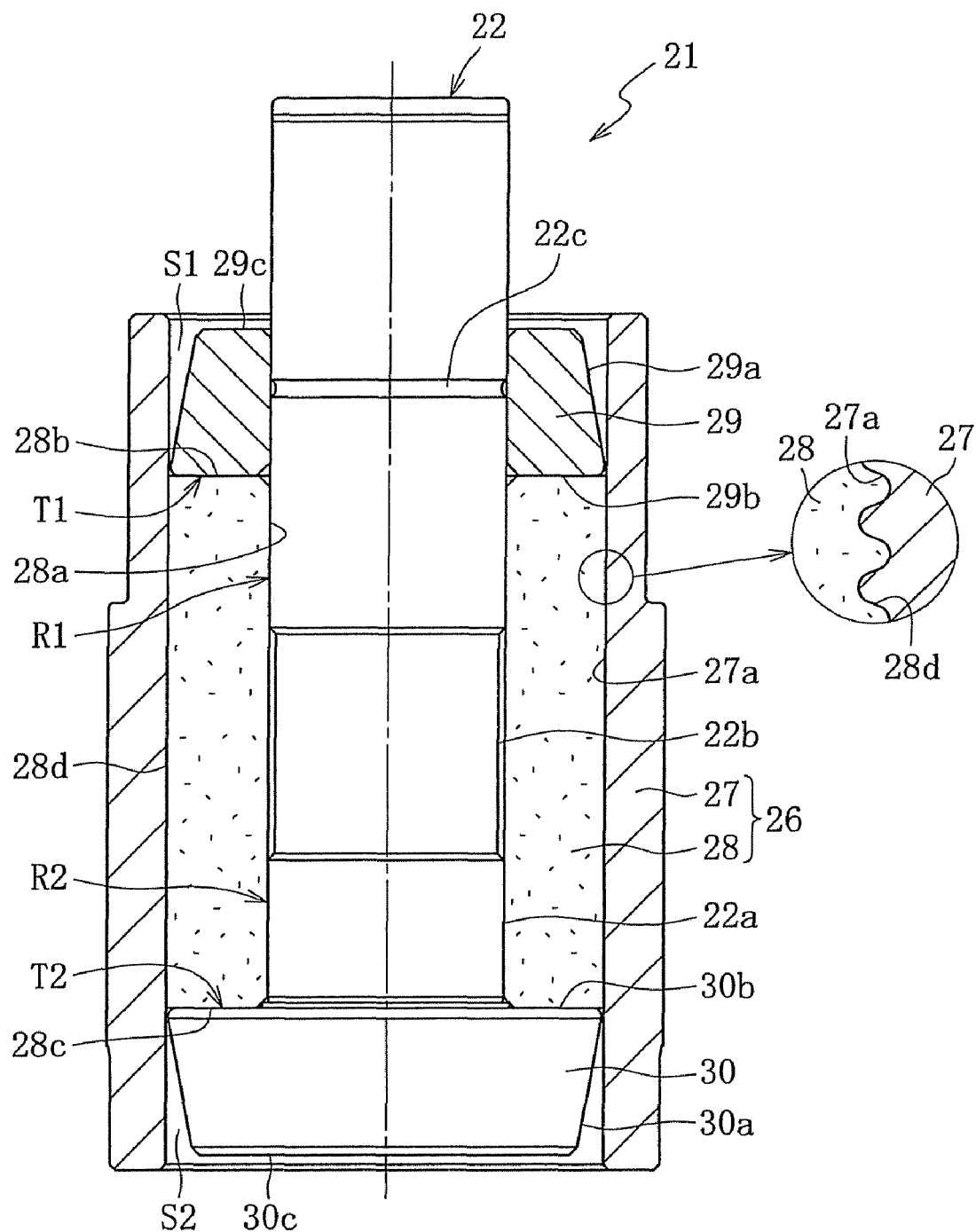
FIG. 10 is a sectional view showing a second configuration example of the second embodiment of the fluid dynamic bearing device.

FIG. 10 shows a second configuration example of the second embodiment of the fluid dynamic bearing device according to the present invention. The fluid dynamic bearing device 21 of this configuration example differs from that shown in FIG. 8 primarily in that either one of the first flange part 29 and the second flange part 30 (in FIG. 10, the second flange part 30) is formed integrally with the shaft member 22. This makes it possible to suppress variations in the assembly precision between the shaft member 22 and the flange part 30 (such as squareness) when fixing the flange part 30, and thus facilitate precision management during assembly. In this case, the shaft member 22 and the second flange part 30 may be made integrally out of metal material, or in a hybrid structure where the shaft member 22 is made of a metal material and the second flange part 30 is made of a resin material.

Figure 11:
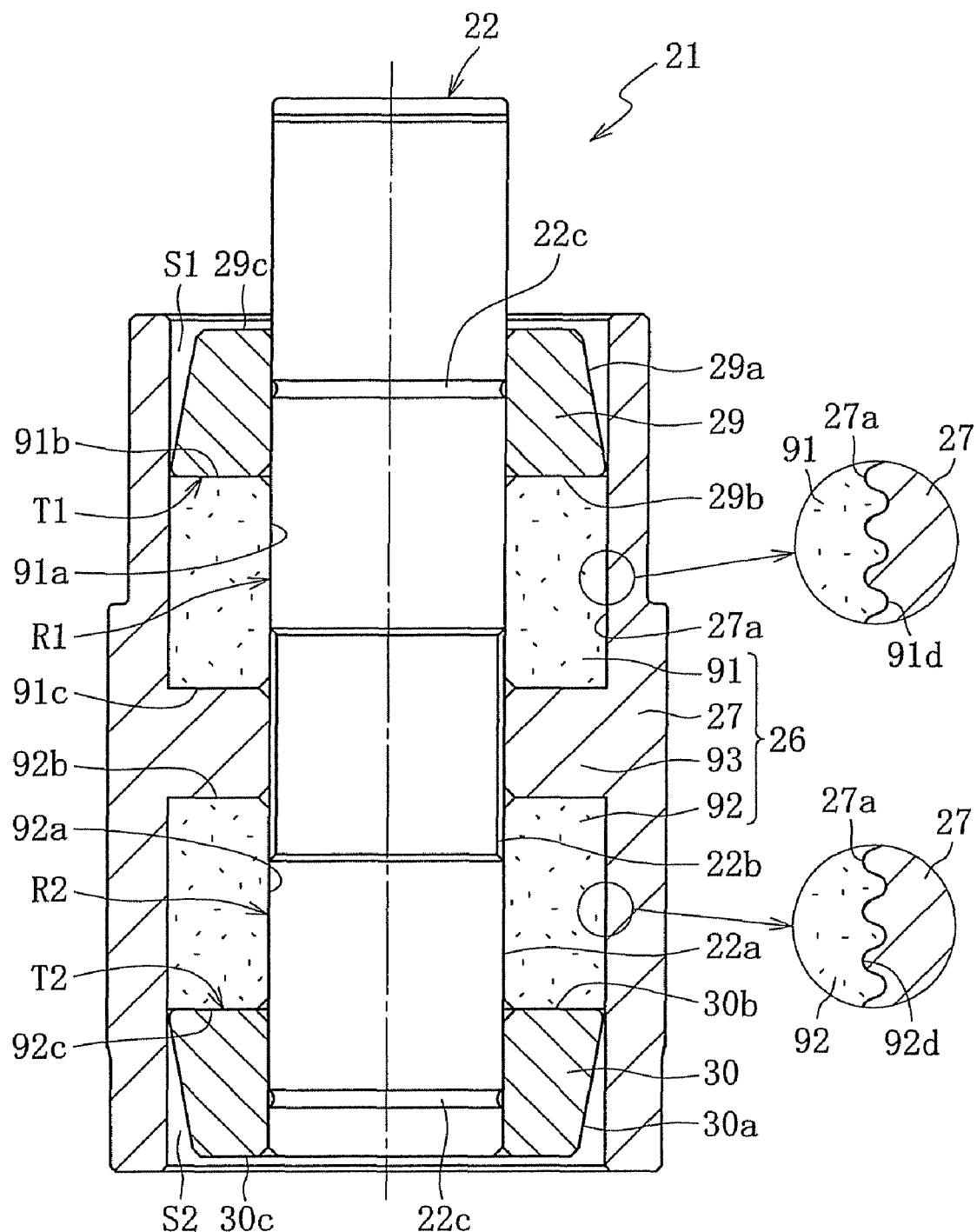
FIG. 11 is a sectional view showing a third configuration example of the second embodiment of the fluid dynamic bearing device.

FIG. 11 shows a third configuration example of the second embodiment of the fluid dynamic bearing device according to the present invention. This fluid dynamic bearing device differs from that shown in FIG. 8 primarily in that: the inner diameter part 28 is composed of a top inner diameter part 91 and a bottom inner diameter part 92; and the outer diameter part 27 is provided with a spacer part 93 for filling the space between the two inner diameter parts 91 and 92. In the present configuration example, a first radial bearing portion R1 is formed between the inner periphery 91a of the top inner diameter part 91 and the outer periphery 22a of the shaft member 22. A second radial bearing portion R2 is formed between the inner periphery 92a of the bottom inner diameter part 92 and the outer periphery 22a of the shaft member 22. In addition, a first thrust bearing portion T1 is formed between the top end 91b of the top inner diameter part 91 and the bottom end 29b of the first seal part 29. A second thrust bearing portion T2 is formed between the bottom end 92c of the bottom inner diameter part 92 and the top end 30b of the second seal part 30.

Figure 12:
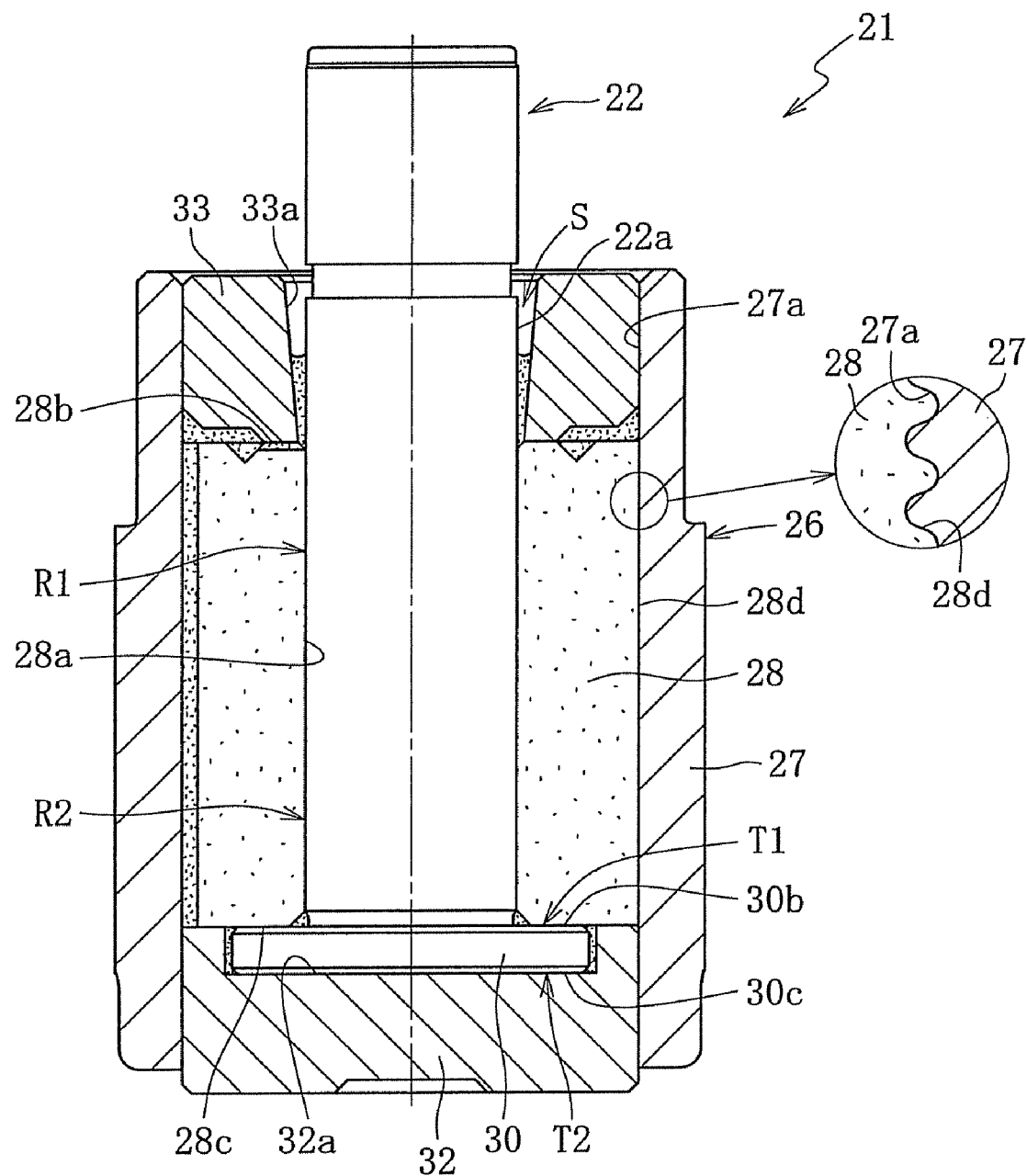
FIG. 12 is a sectional view showing a fourth configuration example of the second embodiment of the fluid dynamic bearing device.

FIG. 12 shows a fourth configuration example of the second embodiment of the fluid dynamic bearing device according to the present invention. This fluid dynamic bearing device 21 differs from those shown in FIGS. 8, 10, and 11 primarily in that: the first and second thrust bearing portions T1 and T2 are formed at both ends of a flange part 30 which is formed on the shaft member 22; and a seal space S is formed only between the outer periphery 22a of the shaft member 22 and the inner periphery 33a of a seal member 33 which is fixed to the inner periphery 27a at the top end of the outer diameter part 27 while the bottom opening of the bearing member 26 is closed with a lid member 32. In the present configuration example, the thrust bearing portions may be configured as a so-called pivot bearing, in which the shaft member 32 is formed in a convex spherical shape at the bottom end so that this shaft end is supported by contact with the top end of the lid member 32.

Figure 13:
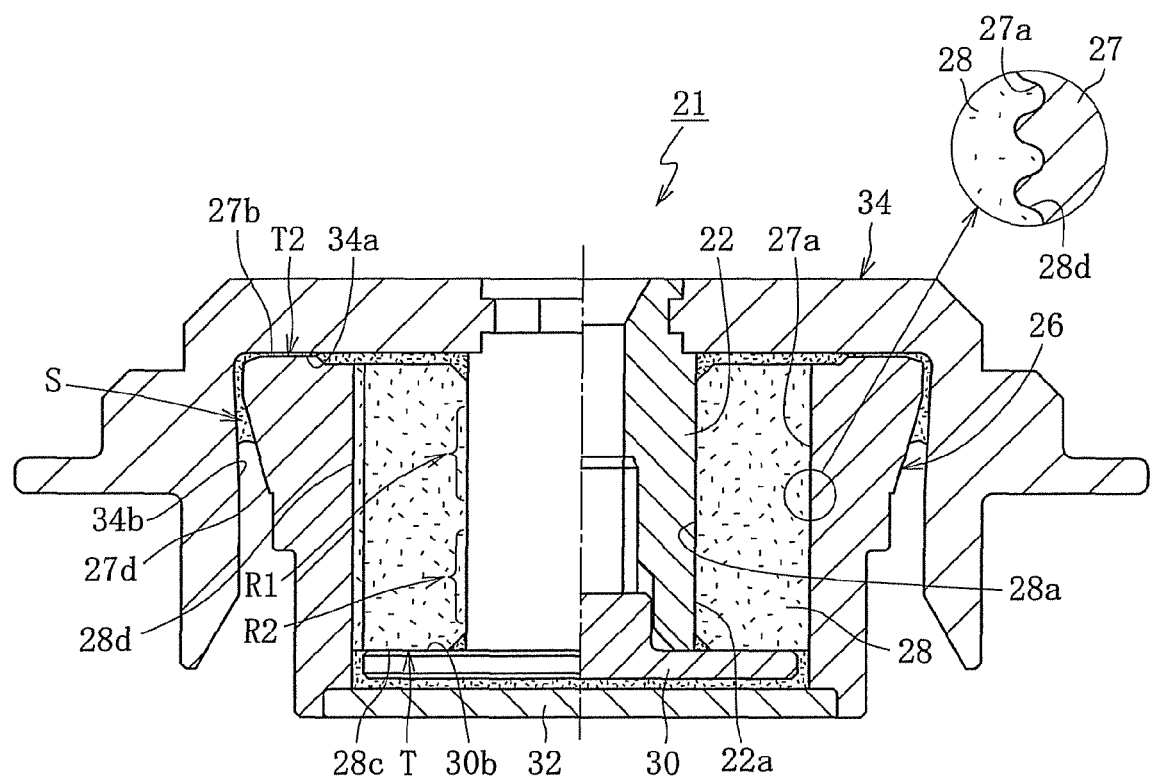
FIG. 13 is a sectional view showing a fifth configuration example of the second embodiment of the fluid dynamic bearing device.

FIG. 13 shows a fifth configuration example of the second embodiment of the fluid dynamic bearing device according to the present invention. The fluid dynamic bearing device 21 shown in the diagram structurally differs from the foregoing modes primarily in that: the second thrust bearing portion T2 is formed between the bottom end 34a of a hub part 34 fixed to the shaft member 22 and the top end 27b of the outer diameter part 27; and a seal space S is formed between the outer periphery 27d of the outer diameter part 27 and the inner periphery 34b of the hub part 34.

The foregoing description has illustrated the configurations in which the radial bearing portions R1 and R2 produce the dynamic pressure effect of the lubricating oil by using the dynamic pressure generating grooves of herringbone shape or spiral shape. Nevertheless, the radial bearing portions R1 and R2 may employ so-called multilobe bearings or step bearings. The multilobe bearings and step bearings are bearings that are configured so that a plurality of lobes or axial grooves are formed on/in each of the areas intended for radial bearing surfaces (not shown).

The foregoing description has also dealt with the cases where the radial bearing portions are formed in two axial positions, like the radial bearing portions R1 and R2. In other possible configurations, however, radial bearing portions may be formed in one, three, or more axial positions.

Moreover, either one or both of the thrust bearing portions T1 and T2 may be configured, for example, as a so-called step bearing, a so-called wave bearing (with wave-shaped steps), or the like in which the area to make a thrust bearing surface has a plurality of dynamic pressure generating grooves of radial groove shape (not shown).

The foregoing description has also dealt with the modes where both the radial bearing portions R1 and R2 are configured as dynamic bearings. Nevertheless, either one or both of the radial bearing portions R1 and R2 may be configured as a cylindrical bearing (not shown).

The foregoing description has illustrated the cases where lubricating oil is used as the fluid that is filled into the fluid dynamic bearing device 1 or 21 to fill the radial bearing clearances between the inner diameter part and the shaft member, and the thrust bearing clearances between the inner diameter part and the shaft member (both the flange parts). Aside from the lubricating oil, it is possible, for example, to use air or other gases, magnetic fluids, etc.

The invention claimed is:

1. A fluid dynamic bearing device comprising: a bearing member including an inner diameter part having a radial bearing surface and an outer diameter part having a mounting surface for another member; and a radial bearing portion for supporting a shaft to be supported in a radial direction with an oil film formed in a radial bearing clearance which the radial bearing surface faces, characterized in that both the inner diameter part and the outer diameter part of the bearing member are made of a resin, the inner diameter part and the outer diameter part are made of different resins, and an outer periphery of the inner diameter part and an inner periphery of the outer diameter part which are opposed to each other are melted and bonded by welding.

2. A fluid dynamic bearing device according to claim 1, wherein the radial bearing surface of the inner diameter part is provided with a dynamic pressure generating portion for generating the dynamic pressure of fluid in the radial bearing clearance.

3. A fluid dynamic bearing device according to claim 1, wherein the inner diameter part is made of an oil-impregnated resin.

4. A fluid dynamic bearing device according to claim 1, wherein the inner diameter part is a porous body.

5. A fluid dynamic bearing device according to claim 1, wherein the outer diameter part is a nonporous body.

6. A fluid dynamic bearing comprising: a bearing member including an inner diameter part having a radial bearing surface and an outer diameter part having a mounting surface for another member; and a radial bearing portion for supporting a shaft to be supported in a radial direction with an oil film formed in a radial bearing clearance which a radial bearing surfaces faces, characterized in that both the inner diameter part and the outer diameter part of the bearing member are made of a resin, the inner diameter part and the outer diameter part are made of different resins, one of the inner diameter part and the outer diameter part that has a lower melting point is used as the insert and other of the inner diameter part and the outer diameter part is injection molded.

7. A fluid dynamic bearing device according to claim 6, wherein the radial bearing surface of the inner diameter part is provided with a dynamic pressure generating portion for generating the dynamic pressure of fluid in the radial bearing clearance.

8. A fluid dynamic bearing device according to claim 6, wherein the inner diameter part is made of an oil-impregnated resin.

9. A fluid dynamic bearing device according to claim 6, wherein the inner diameter part is a porous body.

10. A fluid dynamic bearing device according to claim 6, wherein the outer diameter part is a nonporous body.

* * * * *